US012789541B2

(12) United States Patent
Arakawa et al.

(10) Patent No.: US 12,789,541 B2
(45) Date of Patent: Nov. 10, 2026

(54) CONTROLLING SYSTEM

(71) Applicant: BROTHER KOGYO KABUSHIKI KAISHA, Nagoya (JP)

(72) Inventors: Yuta Arakawa, Nagoya (JP); Haruhisa Shirai, Kasugai (JP); Shoji Sato, Okazaki (JP); Nobumasa Tanaka, Nagoya (JP); Masahiro Hoga, Ogaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/330,521

(22) Filed: Jun. 7, 2023

(65) Prior Publication Data

US 2023/0398798 A1 Dec. 14, 2023

(30) Foreign Application Priority Data

Jun. 8, 2022 (JP) ................................ 2022-093204

(51) Int. Cl.
*B41J 25/00* (2006.01)

(52) U.S. Cl.
CPC .................................. *B41J 25/001* (2013.01)

(58) Field of Classification Search
None
See application file for complete search history.

(56) References Cited

U.S. PATENT DOCUMENTS 6,129,464 A * 10/2000 Nakamura ............ B41J 19/202 400/279
2007/0055724 A1* 3/2007 Harada ................ B41J 11/0095 708/800
2007/0069448 A1* 3/2007 Honda .................. B65H 31/10 271/145
2009/0176793 A1* 7/2009 Hohlweg ............... A61P 19/02 514/252.02

(Continued)

FOREIGN PATENT DOCUMENTS

JP S61-5973 A 1/1986
JP 2010179503 A 8/2010
JP 2013-28138 A 2/2013

*Primary Examiner* — Alejandro Valencia
(74) *Attorney, Agent, or Firm* — Scully, Scott, Murphy & Presser, P. C.

(57) ABSTRACT

A controlling system includes: a motor; a movable body which is moved by the motor along a movement direction and executes an operation for processing a target; a single detecting unit which is mounted on the movable body and detects first and second detection objects during a movement of the movable body; a rotation amount information outputting section which outputs rotation amount information indicating a rotation amount of the motor; and a controller. The controller executes: a moving process for moving the movable body by the motor along the movement direction; a rotation amount information obtaining process for obtaining first rotation amount information and second rotation amount information; a correction value calculating process for calculating a correction value indicating an actual moving distance of the movable body per predetermined rotation (Continued)

amount of the motor; and a moving distance calculating process for calculating a moving distance of the movable body.

10 Claims, 5 Drawing Sheets

(56) References Cited

U.S. PATENT DOCUMENTS

| | | | | |
|---|---|---|---|---|
| 2013/0215165 A1* | 8/2013 | Duke | B41J 3/543 | 347/5 |
| 2013/0229454 A1* | 9/2013 | Yatsunami | B41J 19/202 | 347/14 |
| 2015/0273893 A1* | 10/2015 | Kudo | B41J 3/60 | 347/16 |
| 2023/0100751 A1* | 3/2023 | Blank | B66C 13/30 | 212/284 |

* cited by examiner

CONTROLLING SYSTEM

REFERENCE TO RELATED APPLICATION

This application claims priority from Japanese Patent Application No. 2022-093204 filed on Jun. 8, 2022. The entire content of the priority application is incorporated herein by reference.

BACKGROUND ART

Conventionally, there is known an inkjet recording apparatus configured to detect a position of a carriage by using a rotary encoder. In this inkjet recording apparatus, a sensor is provided at each end of a moving range of the carriage to detect the carriage. The inkjet recording apparatus calculates a correction value based on an actual number of pulses (i.e., count value) from the rotary encoder when the carriage moves between the two sensors and a designed distance between the two sensors or a designed count value. The correction value is used to calculate a moving distance of the carriage.

DESCRIPTION

The above inkjet recording apparatus requires two sensors to calculate the correction value, which increases a manufacturing cost of the inkjet recording apparatus. Furthermore, in the inkjet recording apparatus, since both sensors are provided at both ends of the moving range of the carriage, a problem may arise where the count value detected between the two sensors deviates from a count value corresponding to an actual distance between the two sensors. For example, in a case that the carriage is configured to be detected by the sensors when the carriage stops at the ends of the moving range, the above problem may occur due to mechanical factors (e.g., belt stretching, vibration, etc.) when the carriage stops.

In view of the above-described situation, an object of the present disclosure is to provide a technique capable of calculating a moving distance of a movable body with high accuracy while reducing the manufacturing cost.

A controlling system according to an aspect of the present disclosure includes: a motor; a movable body; a single detecting unit; a rotation amount information outputting section; and a controller. The movable body is moved by the motor along a predetermined movement direction. The movable body executes a predetermined operation for processing a target during a movement along the movement direction. The detecting unit is mounted on the movable body. The detecting unit detects a first detection object and a second detection object during the movement of the movable body. The first detection object and the second detection object are separated from each other along the movement direction and are detected by the detecting unit moving along the movement direction. The rotation amount information outputting section outputs rotation amount information indicating a rotation amount of the motor.

The controller executes: a moving process; a rotation amount information obtaining process; a correction value calculating process; and a moving distance calculating process. The moving process is a process for moving the movable body by the motor along the movement direction. The rotation amount information obtaining process is a process for obtaining first rotation amount information and second rotation amount information. The first rotation amount information is the rotation amount information outputted from the rotation amount information outputting section under a condition that the detecting unit detects the first detection object during the movement of the movable body in the moving process. The second rotation amount information is the rotation amount information outputted from the rotation amount information outputting section under a condition that the detecting unit detects the second detection object during the movement of the movable body in the moving process. The correction value calculating process is a process for calculating a correction value based on the first rotation amount information and the second rotation amount information obtained in the rotation amount information obtaining process and theoretical distance information. The theoretical distance information indicates a design distance between the first detection object and the second detection object. The correction value indicates directly or indirectly an actual moving distance of the movable body per predetermined rotation amount of the motor. The moving distance calculating process is a process for calculating a moving distance of the movable body by using the rotation amount information outputted from the rotation amount information outputting section and the correction value calculated in the correction value calculating process. A controlling process is a process for controlling a predetermined operation by the movable body based on the moving distance of the movable body calculated in the moving distance calculating process.

In the above described controlling system, the first detection object and the second detection object are detected in a state that the movable body is being moved. The first detection object and the second detection object are detected by the single detecting unit mounted on the movable body. Therefore, it is possible to calculate the moving distance of the movable body with high accuracy while reducing the manufacturing cost.

The rotation amount information outputting section may include a rotary encoder. The rotary encoder outputs a signal each time the motor rotates a predetermined angle in a predetermined rotation direction. The rotation amount information outputting section may output the rotation amount information based on the signal outputted from the rotary encoder.

The controller may further execute the controlling process based on the moving distance calculated in the moving distance calculating process. The controlling process may include, for example, controlling the predetermined operation by the movable body.

In the moving distance calculating process, the controller may further calculate a position of the movable body from a defined position based on a moving distance from the defined position. In this case, the controller may control the predetermined operation of the movable body based on the calculated position of the movable body, in the controlling process.

The "single detecting unit" described above may mean that only one detecting unit is mounted on the movable body. Alternatively, the "single detecting unit" may mean that the movable body is equipped with multiple detecting units, but that the first and second rotation amount information based on a detection result of only one of the multiple detecting units is used in the calculation of the correction value.

In the following, an explanatory embodiment of the present disclosure will be explained with reference to the drawings.

1. Embodiment

(1) Configuration of Image Forming System

Figure 1:
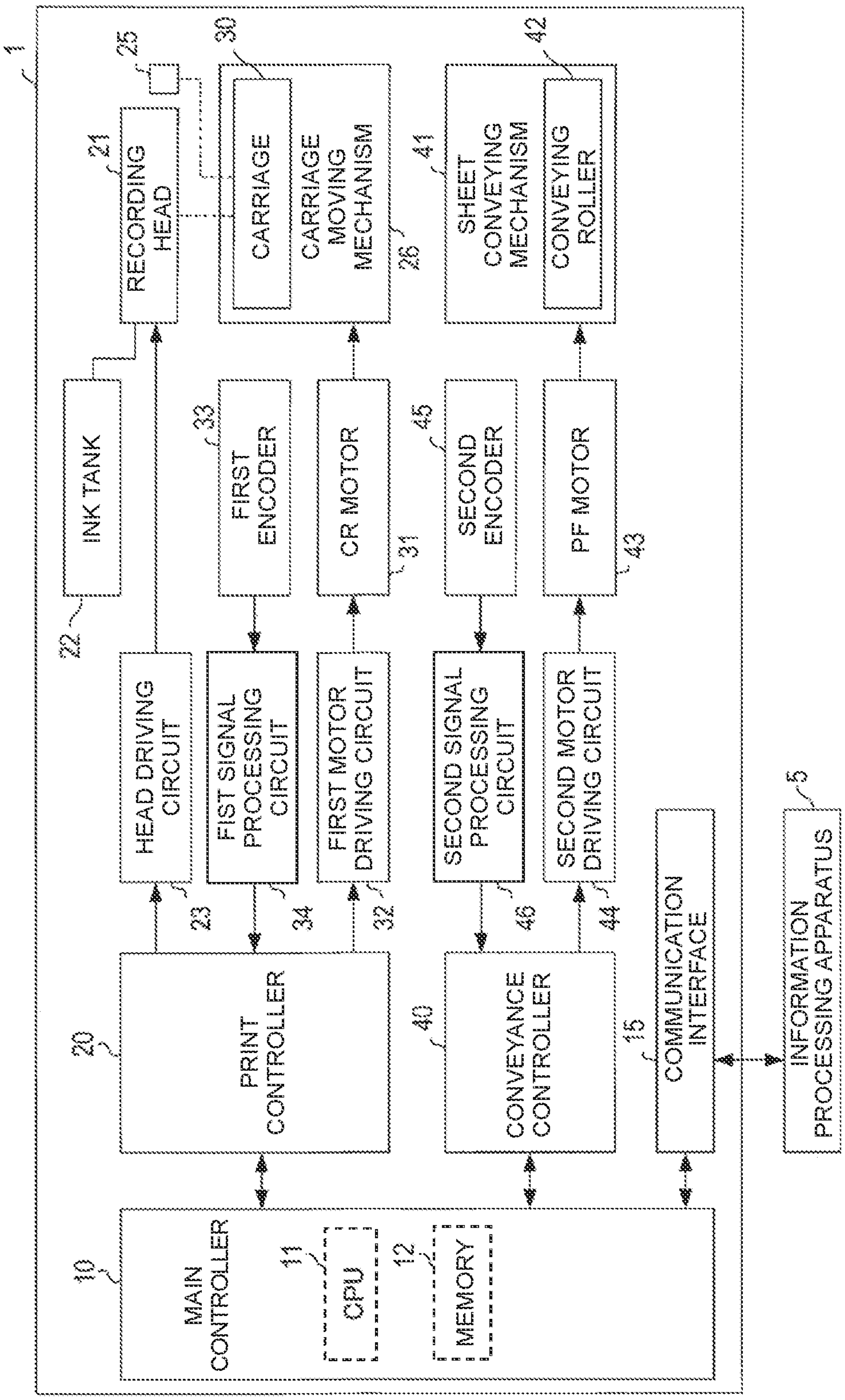
FIG. 1 is a block diagram depicting a configuration of an image forming system of an embodiment.

An image forming system 1 depicted in FIG. 1 is configured as an ink-jet printer. The image forming system 1 is provided with a main controller 10, a communication interface 15, a print controller 20 and a conveyance controller 40.

The main controller 10 is provided with a CPU 11 and a memory 12. The memory 12 is capable of storing a variety of kinds of programs, data, etc. The memory 12 is provided, for example, with a ROM and a RAM. The ROM stores a variety of kinds of programs. The CPU 11 executes a processing in accordance with these programs. The RAM is used a workspace in a case that the CPU 11 executes the processing. The memory 12 may further include a non-volatile storage medium of which storage content is electrically rewriteable (for example, NVRAM). The NVRAM stores data which is required to be stored (maintained) even at a time when the power source of the image forming system 1 is switched OFF. The NVRAM may store a program.

The CPU 11 executes a processing in accordance with the program stored in the memory 12 to thereby control respective parts or components inside the image forming system 1 and to realize respective functions. In the following, a processing executed by the CPU 11 will be explained as a processing executed by the main controller 10.

The communication interface 15 is configured to be capable of performing data communication with an information processing apparatus 5 such as a personal computer, etc. The communication interface 15 may be capable of communicating with the information processing apparatus 5 in accordance, for example, with a communication system such as a USB communication, a Bluetooth communication (Bluetooth is a registered trade mark of Bluetooth SIG), a wired LAN or wireless LAN, etc.

Figure 2:
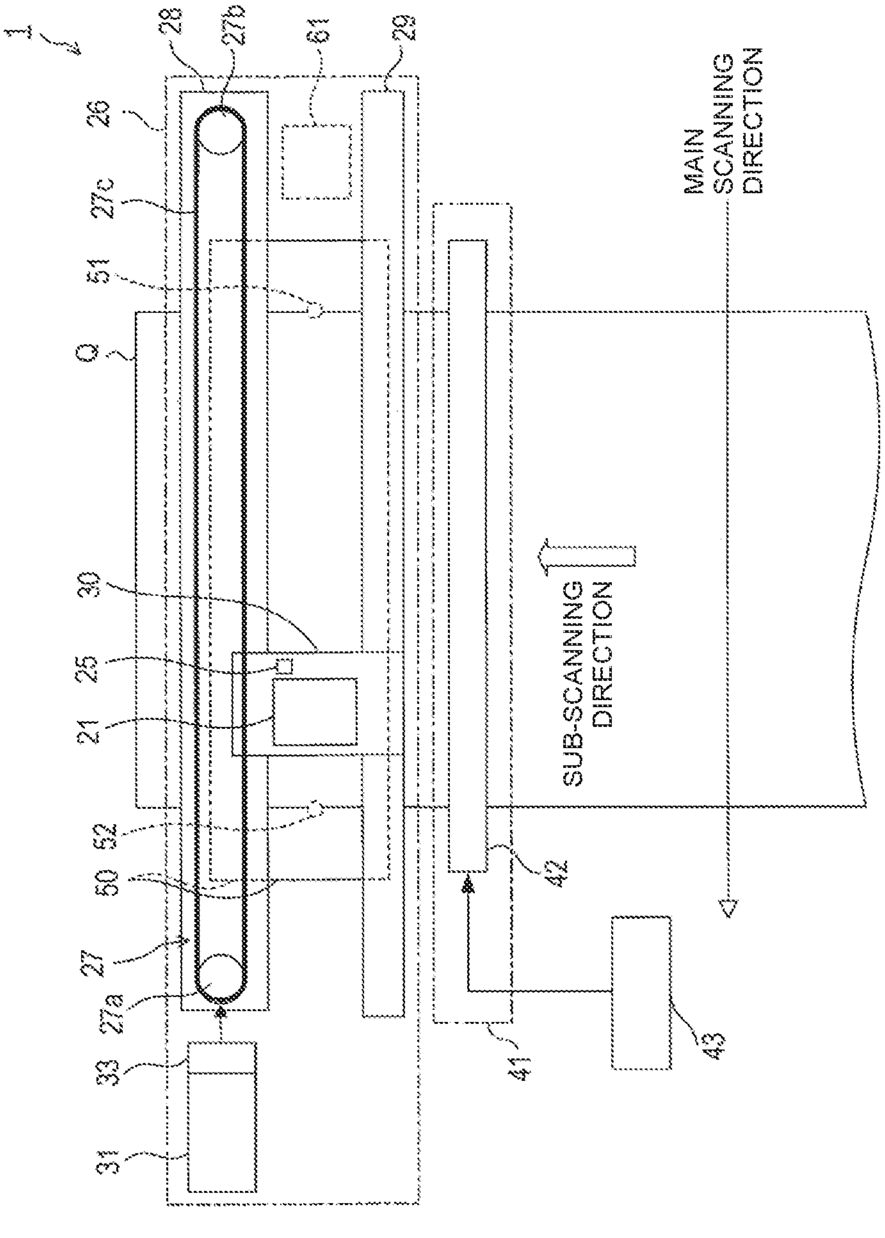
FIG. 2 is a view for explaining a configuration of a carriage moving mechanism and a configuration of a sheet conveying mechanism.

In a case that the main controller 10 obtains image data as an object of printing (printing object) from an external apparatus or device (for example, the image processing apparatus 5) via the communication interface 15, the main controller 10 inputs a variety of kinds of instructions to the print controller 20 and the conveyance controller 40 so that an image based on the image data is printed on a sheet (paper sheet, paper) Q (see FIG. 2).

The image forming system 1 is further provided with: a recording head 21, an ink tank 22, a head driving circuit 23, a medium sensor 25, a carriage moving mechanism 26, a CR motor 31, a first motor driving circuit 32, a first encoder 33 and a first signal processing circuit 34. The carriage moving mechanism 26 is provided with a carriage 30, and causes the carriage 30 to reciprocally move in a main scanning direction. The carriage 30 has the recording head 21 and the medium sensor 25 mounted thereon. In a case that the carriage 30 moves, the recording head 21 and the medium sensor 25 also move together with the carriage 30. The recording head 21 jets an ink toward the sheet Q. The medium sensor 25 detects the sheet Q. In the present embodiment, the medium sensor 25 further detects a first detection object 51 and a second detection object 52 (see FIG. 2, which will be described later on). In the present embodiment, the only one medium sensor 25 is mounted on the carriage 30.

The CR motor 31 is a driving source of the carriage 30. The print controller 20 controls the CR motor 31 in accordance with a motor driving instruction from the main controller 10 to thereby control conveyance of the carriage 30 by the carriage moving mechanism 26. The print controller 20 further controls a jetting operation of the ink by the recording head 21 in accordance with an ink jetting instruction from the main controller 10. By performing these controls, the print controller 20 forms the image on the sheet Q.

The ink is filled in the ink tank 22. The ink tank 22 in the present embodiment is not mounted on the carriage 30; rather, the ink tank 22 is arranged at a predetermined position in the image forming system 1. The recording head 21 is connected to the ink tank 22 via a tube (not depicted in the drawings). The ink is supplied from the ink tank 22 to the recording head 21 via the tube. The recording head 21 jets the ink supplied from the ink tank 22.

The head driving circuit 23 drives the recording head 21 in accordance with a control signal from the print controller 20. The carriage moving mechanism 26 transmits a rotational force generated by the CR motor 31 to the carriage 30. The carriage 30 is reciprocally moved along the main scanning direction by the CR motor 31 and the carriage moving mechanism 26. The main scanning direction is orthogonal to a sub-scanning direction. The sub-scanning direction is the conveyance direction of the sheet Q by a sheet conveying mechanism 41 which will be described later on.

The CR motor 31 is, for example, an aspect of a direct current motor. The first motor driving circuit 32 supplies a driving electricity, corresponding to an operation amount inputted from the print controller 20, to the CR motor 31, thereby driving the CR motor 31.

The first motor driving circuit 32 may, for example, apply a voltage or an electric current corresponding to the operation amount to the CR motor 31 to thereby drive the CR motor 31. Further, for example, the first motor driving circuit 32 may drive the CR motor 31 by a PWM (Pulse Width Modulation) control.

The first encoder 33 outputs a signal corresponding to a displacement of the carriage 30 in the main scanning direction (hereinafter referred to as a “first encoder signal”). The first encoder 33 of the present embodiment is an aspect of a rotary encoder. The first signal processing circuit 34 calculates a count value based on the first encoder signal inputted from the first encoder 33 as will be described later on, and detects a velocity Vx of the carriage 30 based on the count value. The count value and the velocity Vx are inputted to the print controller 20. The count value and the velocity Vx may further be inputted to the main controller 10.

The print controller 20 detects a position Px of the carriage 30 based on the count value inputted from the first signal processing circuit 34. The print controller 20 determines an operation amount with respect to the CR motor 31 based on the position Px of the carriage 30 detected and the velocity Vx of the carriage 30 inputted from the first signal processing circuit 34 and controls the CR motor 31. With this, the print controller 20 realizes conveyance control of the carriage 30 in accordance with the motor driving instruction from the main controller 10.

The print controller 20 further inputs, to the head driving circuit 23, a control signal for realizing jetting control of the ink in accordance with the ink jetting instruction from the main controller 10, based on the detected position Px of the carriage 30. With this, ink for forming the image as the print object is jetted from the recording head 21 onto the sheet Q.

The image forming system 1 is further provided with a sheet conveying mechanism 41, a PF motor 43, a second motor driving circuit 44, a second encoder 45 and a second signal processing circuit 46. The conveyance controller 40 controls the PF motor 43 in accordance with a conveyance instruction from the main controller 10 to thereby control the conveyance of the sheet Q.

As depicted in FIGS. 1 and 2, the sheet conveying mechanism 41 is provided with a conveying roller 42. The conveying roller 42 extends in the main scanning direction on the upstream side, in the sub-scanning direction, with respect to the recording head 21. The conveying roller 42 rotates by receiving a rotational force from the PF motor 43 to thereby convey the sheet Q which is being conveyed from further upstream side toward a downstream side in the sub-scanning direction. The sheet Q is conveyed in the sub-scanning direction according to the operation of the recording head 21, namely, while an image is being formed thereon by the recording head 21.

The PF motor 43 is, for example, an aspect of a direct current motor. The second motor driving current 44 applies the driving electric power in accordance with an operation amount inputted from the conveyance controller 40 to the PF motor 43 to thereby drive the PF motor 43. The second encoder 45 in the present embodiment is an aspect of a rotary encoder. The second encoder 45 is arranged, for example, in a rotational shaft of the PF motor 43 or a rotation shaft of the conveying roller 42. The second encoder 45 outputs a signal in accordance with the rotation of the rotational shaft in which the second encoder 45 is arranged (hereinafter referred to as a "second encoder signal").

The second signal processing circuit 46 detects a rotational amount and a rotational velocity of the conveying roller 42 based on the second encoder signal inputted from the second encoder 45. The rotational amount and the rotational velocity of the conveying roller 42 correspond to a conveying amount and a conveying velocity of the sheet Q conveyed by the rotation of the conveying roller 42.

The rotational amount and the rotational velocity detected by the second signal processing circuit 46 is inputted to the conveyance controller 40. The conveyance controller 40 determines an operation amount with respect to the PF motor 43 based on the rotational amount and the rotational velocity inputted from the second signal processing circuit 46, and controls the PF motor 43. By doing so, the conveyance controller 40 controls the conveyance of the sheet Q by the conveying roller 42.

The specific configuration of the carriage moving mechanism 26 will be explained with reference to FIG. 2. The carriage moving mechanism 26 is provided with the carriage 30, a belt mechanism 27, a first guide rail 28 and a second guide rail 29. The belt mechanism 27 is provided with a driving pulley 27*a*, a driven pulley 27*b* and a belt 27*c*. The driving pulley 27*a* and the driven pulley 27*b* are arranged along the main scanning direction. The belt 27*c* is wound around the driving pulley 27*a* and the driven pulley 27*b*.

The carriage 30 is fixed to the belt 27*c*. In the belt mechanism 27, the driving pulley 27*a* rotates by receiving a driving force from the CR motor 31. Accompanying with and following the rotation of the driving pulley 27*a*, the belt 27*c* and the driven pulley 27*b* are rotated.

The first and second guide rails 28 and 29 extend along the main scanning direction. The first and second guide rails 28 and 29 are arranged to be separated from each other in the sub-scanning direction. The belt mechanism 27 is arranged, for example, in the first guide rail 28. A projected wall (not depicted in the drawings) which extends along the main scanning direction is formed in the first and second guide rails 28 and 29. This wall regulates a moving direction in which the carriage 30 moves to the main scanning direction.

The carriage 30 moves along the main scanning direction on the first and second guide rails 28 and 29 while being linked with the rotation of the belt 27*c*, and while the moving direction of the carriage 30 is regulated by the first and second guide rails 28 and 29. The recording head 21 and the medium sensor 25 move integrally with the carriage 30 along the main scanning direction, in accompanying with the movement of the carriage 30.

As depicted in FIG. 2, the image forming system 1 is further provided with a platen 50. The platen 50 supports the sheet Q conveyed by the sheet conveying mechanism 41. Namely, the sheet Q is conveyed on the platen 50. A length in the main scanning direction of the platen 50 is longer than a length in the main scanning direction of the sheet Q.

The platen 50 is a single member formed in one piece. The platen 50 is formed and arranged so that a landing position of the ink on the sheet Q, in a case that the ink jetted from the recording head 21 lands on the sheet Q, is present on the platen 50. In other words, the platen 50 is extended along the main scanning direction to face the recording head 21 moving together with the carriage 30. In the present embodiment, the platen 50 extends, in the sub-scanning direction, from a back side of the first guide rail 28 up to a back side of the second guide rail 29, as depicted in FIG. 2 as an example.

The first encoder 33 is arranged on a detection target-rotary body. The detection target-rotary body may be any rotary body which is configured so that the rotation of the detection target-rotary body and the movement of the carriage 30 are synchronized or follow each other. Namely, the carriage 30 moves together with the rotation of the detection target-rotary body. The detection target-rotary body may be the CR motor 31 (specifically, a rotational shaft of the CR motor 31), the driving pulley 27*a* or the driven pulley 27*b*. In the present embodiment, the detection target-rotary body is, for example, the CR motor 31; as depicted in FIG. 2, the first encoder 33 is provided on the CR motor 31. The first encoder 33 outputs a pulse each time the CR motor 31 rotates a certain angle.

The first encoder 33 is, more specifically, provided with a disc-shaped scale (not depicted in the drawings) and an optical sensor (not depicted in the drawings). The scale is fixed to the detection target-rotary body so that the center of the scale is arranged on the rotational shaft of the detection target-rotary body. Namely, the scale rotates integrally with the detection target-rotary body.

The scale is provided with a slit array (not depicted in the drawings). The slit array includes a plurality of slits which are arranged in the entire circumference of the disc-shaped scale and at equal intervals therebetween along the circumferential direction of the scale. The optical sensor is fixed and arranged in the inside of a casing of the image forming system 1 so that the optical sensor faces the slit array. The optical sensor has a detection position at which the optical sensor detects presence or absence of a slit. Each of the plurality of slits passes the detection position in a case that the scale is rotated. The optical sensor outputs the above described first encoder signal in accordance with the displacement of the carriage 30 in the main scanning direction. The first encoder signal includes the above described pulse which is outputted every time a slit (each of the plurality of slits) passes the detection position of the optical sensor (namely, each time the CR motor 31 rotates the certain angle).

The optical sensor of the present embodiment outputs a high level signal in a case that a slit (each of the plurality of slits) is passing the detection position, and outputs a low level signal in a case that the slit is not present in the detection position. With this, the first encoder signal which is a pulse signal in accordance with the occurrence of a phenomenon that the slit passes the optical sensor is outputted. The first encoder signal is an analog signal. The first encoder signal is inputted to the first signal processing circuit 34.

Note that the image forming system 1 may be provided with two optical sensors. In this case, the two optical sensors are referred to, respectively, as an A-phase sensor and a B-phase sensor. Further, a detection position of the A-phase sensor is referred to as an A-phase detection position and a detection position of the B-phase sensor is referred to as a B-phase detection position. Furthermore, the first encoder signal from the A-phase sensor is referred to as an A-phase encoder signal and the first encoder signal from the B-phase sensor is referred to as a B-phase encoder signal. The A-phase sensor and the B-phase sensor are arranged to be separated from each other along an arrangement direction of the plurality of slits (namely, along the circumferential direction of the scale). Namely, the A-phase detection position and the B-phase detection position are separated from each other along the circumferential direction of the scale. Accordingly, the phase of the A-phase signal and the phase of the B-phase signal are different from each other by $\pi/2$. The A-phase encoder signal and the B-phase encoder signal are inputted to the first signal processing circuit 34. In the present embodiment, as an example, the explanation will be given provided that the first encoder 33 is provided with the A-phase sensor and the B-phase sensor.

The first signal processing circuit 34 detects a pulse edge of each of the A-phase encoder signal and the B-phase encoder signal. The pulse edge includes a rising edge at which the low level is changed to the high level, and a falling edge at which the high level is changed to the low level.

The first signal processing circuit 34 performs counting of the pulse edge every time the pulse edge of either one of the A-phase encoder signal and the B-phase encoder signal is detected. Specifically, every time the pulse edge of either one of the A-phase encoder signal and the B-phase encoder signal is detected, the first signal processing circuit 34 performs count-up (increments) or performs count-down (decrements) a count value of the pulse edge, in accordance with a signal level of the other of the A-phase encoder signal and the B-phase encoder signal at the time of the detection. For example, it is allowable that the count value is counted up every time the pulse edge is detected in a case that the carriage 30 is moving in the main scanning direction, and that the count value is counted down every time the pulse edge is detected in a case that the carriage 30 is moving in a direction opposite to the main scanning direction (hereinafter referred to as a "home direction"). The count value may be cleared to be an initial value (for example, 0 (zero)) in a case that a predetermined clear condition is established. The predetermined clear condition may include, for example, such a situation that the carriage 30 is moved to a home position, as will be described later on.

The first signal processing circuit 34 outputs the count value to the print controller 20 as described above. The first signal processing circuit 34 further detects the velocity Vx of the carriage 30, based on a time interval at which the pulse edge of the A-phase encoder signal is detected or a time interval at which the pulse edge of the B-phase encoder signal is detected. The first signal processing circuit 34 outputs the velocity Vx which is detected to the print controller 20.

The medium sensor 25 is provided to face the platen 50, at a lower surface of the carriage 30 (a surface facing the platen 50). The medium sensor 25 detects an object to be detected (detection-object) such as the sheet Q, the first and second detection objects 51 and 52, etc. The medium sensor 25 is provided with a light-emitting part (not depicted in the drawings) and a light-receiving part (not depicted in the drawings). The light-emitting part includes, for example, a light-emitting element such as a light-emitting diode, etc. The light-receiving part receives a light and outputs a detection signal indicating a light-receiving amount.

The main controller 10 outputs a light-emitting instruction to the light-emitting part during a period of time in which the detection object is to be detected. The light-emitting instruction includes a light-emitting amount. In a case that the light-emitting part receives the light-emitting instruction from the main controller 10, the light-emitting part emits the light of an instructed light-emitting amount in a predetermined light-emitting direction. The light-emitting direction is, for example, a direction which is orthogonal or substantially orthogonal to the sheet Q on the platen 50 and is a direction toward the platen 50.

A light irradiated from the light-emitting part is reflected off on an object such as the platen 50, the sheet Q supported by the platen 50, etc., and a reflected light thereof is received by the light-receiving part. In the present embodiment, the irradiated light may be irradiated also onto the first and second detection objects 51 and 52 and may be reflected off by the first and second detection objects 51 and 52.

An amount of the reflected light received by the light-receiving part depends on a distance from the light-emitting part to a detection target and physical characteristics of the detection target, such as a shape, material, and color. The medium sensor 25 outputs a detection signal indicating the amount of light received by the light-receiving part to the printing controller 20 and the main controller 10. For example, the medium sensor 25 outputs a detection signal to the print controller 20 and the main controller 10 such that the greater the amount of light received, the higher the voltage.

The print controller 20 detects the detection target based on the detection signal inputted from the medium sensor 25. The print controller 20 may detect the detection target in any way based on the detection signal. For example, a light-receiving amount range may be set for each detection target. The print controller 20 may then determine the detection target based on the light-receiving amount range of the detection target in which the light-receiving amount indicated by the detection signal is included. For example, a range of the light-receiving amount changes may be set for each detection target. The print controller 20 may detect the detection target when a change in the light-receiving amount occurs such that a change amount in the light-receiving amount is included in the range of light-receiving amount changes for any of the detection targets. The main controller 10 may also detect the detection target in the same manner as the print controller 20. Alternatively, the detection result by the print controller 20 may be transmitted to the main controller 10. Conversely, the main controller 10 may be configured to detect the detection target and the print controller 20 may acquire the detection result.

The carriage 30 is basically kept in a home position 61 depicted in FIG. 2 while no printing is being performed. When the main controller 10 obtains image data from an external source, the main controller 10 performs a pre-scan, which is described below, prior to printing. In the pre-scan, the carriage 30 is reciprocated at least once along the main scanning direction. The main controller 10 detects a presence and a width (i.e., length in the main scanning direction) of the sheet Q based on the detection signals from the medium sensor 25 during the pre-scan. Then, after the pre-scan is completed, the main controller 10 outputs the motor driving instruction and the ink jetting instruction to execute an image formation on the sheet Q. Specifically, every time the sheet Q is conveyed in the sub-scanning direction by a certain amount, the carriage 30 is reciprocated along the main scanning direction, and the ink is jetted from the recording head 21 onto the sheet Q during the reciprocating movement.

(2) Calculation of Carriage Position During Image Formation

The ink is jetted onto the sheet Q by the recording head 21 based on the position Px of the carriage 30 (and thus the position of the recording head 21) detected by the print controller 20. The print controller 20 basically detects the position Px of the carriage 30 based on the count value outputted from the first signal processing circuit 34. The print controller 20 causes the recording head 21 to jet the ink according to the detected position Px of the carriage 30 based on the ink jetting instruction from the main controller 10, while moving the carriage 30 in the main scanning direction and the home direction.

The print controller 20 may detect the position Px of the carriage 30 by, for example, multiplying a design moving distance per one count of the count value (hereinafter referred to as "theoretical unit moving distance") by the count value.

However, if the actual moving distance per one count does not match the theoretical unit moving distance, the position Px of the carriage 30 cannot be detected correctly. In other words, the position Px of the carriage 30 detected by the print controller 20 does not match the actual position of the carriage 30. Factors which may cause the actual moving distance per one count to not match the theoretical unit moving distance include errors in spacing of the slit row of the first encoder 33 and errors in pitch of the belt 27*c*, etc.

To solve this problem, for example, the carriage 30 is moved one way from one end to the other end of a movable range of the carriage 30, and the actual moving distance of the carriage 30 per one count (hereinafter referred to as "correction value Y") may be calculated based on the change in the count value during that time and the design distance of the movable range. However, in this method, the correction value Y may not be calculated accurately due to the effects of deflection of the belt 27*c* and other factors.

Figure 3:
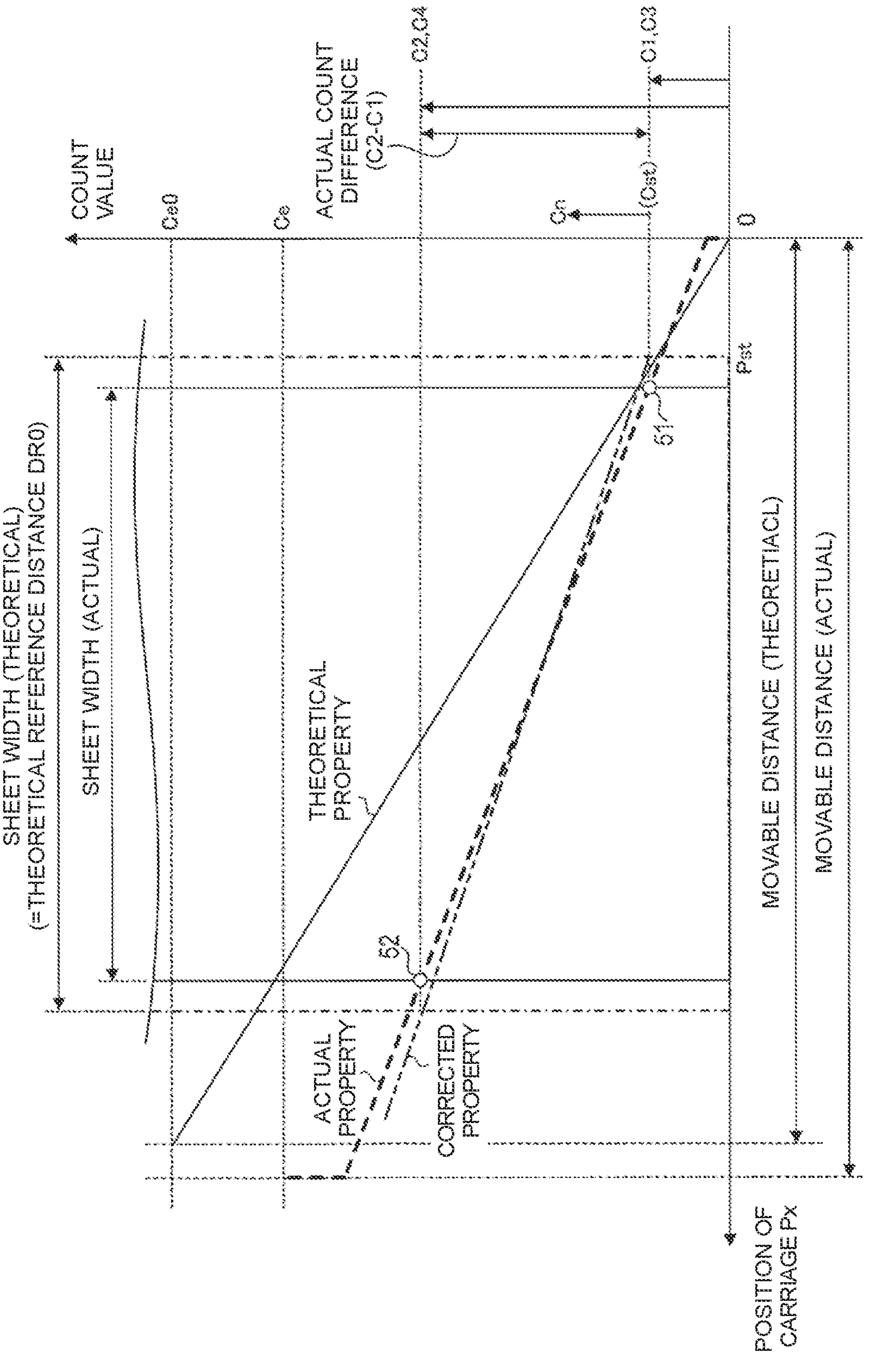
FIG. 3 is a view for explaining a relationship between a count value based on a signal from an encoder and a position of a carriage as well as a correction calculation.

That is, as illustrated as the "actual characteristic" in FIG. 3, even if the driving of the CR motor 31 is started to move the carriage 30 to the one end of the movable range (e.g., home position 61), the carriage 30 may not move immediately after the start of the driving of the CR motor 31. After the CR motor 31 rotates by a small amount (slight increase in the count value), the carriage 30 may actually start moving.

In FIG. 3, the vertical axis indicates the count value outputted from the first signal processing circuit 34. The horizontal axis indicates the position Px of the carriage 30 in the main scanning direction, with the home position 61 as the reference (origin "0"). The origin "0" indicates that the count value is "0" on the vertical axis. The "movable distance" indicates the length of the movable range. FIG. 3 depicts an example of an error between the actual movable distance and the theoretical (design) movable distance. FIG. 3 also illustrates that the count value and the position Px of the carriage 30 change linearly, as illustrated as the "theoretical property". In other words, theoretically, the count value reaches Ce0 when the carriage 30 reaches the other end of the movable range. FIG. 3 also illustrates that the change of the count value and the position Px of the carriage 30 does not follow the "theoretical property" in reality, but the count value and the position Px of the carriage 30 change as depicted as the "actual property". In the "actual property", the final count value Ce does not match the designed count value Ce0. Moreover, even after the CR motor 31 begins to rotate and the count value begins to increase, the carriage 30 does not move immediately due to deflection of the belt 27*c* or mechanical factors. Further, even after the carriage 30 is moved to the other end of the movable range and stops, the CR motor 31 rotates by a small amount due to the deflection of the belt 27*c* and the mechanical factors, and the count value also increases as a result. Therefore, even if the correction value Y is calculated by using the "actual property", a highly accurate correction value Y cannot be expected. FIG. 3 also depicts an example where there is an error between the actual width of the sheet Q and the theoretical width.

In view of the aforementioned problem, the print controller 20 in this embodiment calculates the correction value Y by the method described below. Then, the position Px of the carriage 30 is detected by using the correction value Y In order to calculate the correction value Y, the image forming system 1 of this embodiment is provided with a first detection object 51 and a second detection object 52, as illustrated in FIGS. 2 and 3.

The first and second detection objects 51, 52 are spaced apart from each other along the main scanning direction. The first and second detection objects 51 and 52 are provided at positions which can be detected by the medium sensor 25 and which can be detected by the medium sensor 25 while the carriage 30 is moving (i.e., not stopped). The first and second detection objects 51 and 52 are provided in a single member (i.e., integrally formed member) in the image forming system 1.

In this embodiment, the first and second detection objects 51, 52 are set on the sheet Q. Specifically, a first end of the sheet Q is set as the first detection object 51 and a second end of the sheet Q is set as the second detection object 52. The first end of the sheet Q corresponds to an upstream end of the sheet Q in the main scanning direction. The second end of the sheet Q corresponds to a downstream end of the sheet Q in the main scanning direction.

In other words, in the image forming system 1 of this embodiment, the first and second detection objects 51, 52 are not independently provided members. In this embodiment, the first and second edges of the sheet Q function as the first and second detection objects 51 and 52. As described below, the first and second detection objects 51, 52 may be provided independently of the sheet Q, respectively.

At a timing when the printing should be performed, such as when the image data is obtained from the external source, the print controller 20 first performs a pre-scan prior to the printing. The pre-scan is performed for a specific purpose other than image formation. The specific purpose may include, for example, to determine presence or absence of the sheet Q on the platen 50, to determine the width (length in the main scanning direction) of the sheet Q on the platen 50, to determine whether or not the carriage 30 can be reciprocated properly along the main scanning direction, to determine whether the state of the first encoder 33 (e.g., the state of the slit rows in the scale) is normal or not, and the like.

In the pre-scan, the carriage 30 is reciprocated at least once along the main scanning direction from the home position 61. The print controller 20 obtains a first count value C1, a second count value C2, a third count value C3, and a fourth count value C4 during the movement of the carriage 30 in the main scanning direction by the pre-scan, and stores the first to fourth count values C1 to C4 in a storage unit (not depicted in the drawings).

The first count value C1 corresponds to the count value from the first signal processing circuit 34 when the first detection object 51 is detected by the medium sensor 25 during the movement of the carriage 30 along the main scanning direction. The second count value C2 corresponds to the count value from the first signal processing circuit 34 when the second detection object 52 is detected by the medium sensor 25 during the movement of the carriage 30 along the main scanning direction.

The third count value C3 corresponds to the count value from the first signal processing circuit 34 when the first end of the sheet Q is detected by the medium sensor 25 during the movement of the carriage 30 in the main scanning direction. The fourth count value C4 corresponds to the count value from the first signal processing circuit 34 when the second end of the sheet Q is detected by the medium sensor 25 during the movement direction of the carriage 30 in the main scanning direction.

In this embodiment, as an example, the count value is set to an initial value (e.g., zero) when the carriage 30 is present at the home position 61. Therefore, in this embodiment, as the carriage 30 is moved from the home position 61 toward the main scanning direction, the count value is added from zero. Conversely, as the carriage 30 is moved toward the home direction, the count value is subtracted.

In this embodiment, as described above, the first end of the sheet Q coincides with the first detection object 51 and the second end of the sheet Q coincides with the second detection object 52. Therefore, in this embodiment, the first count value C1 is equal to the third count value C3 and the second count value C2 is equal to the fourth count value C4.

The print controller 20 obtains the first and second count values C1 and C2 stored by the pre-scan and a theoretical reference distance Dr0. As illustrated in FIG. 3, the theoretical reference distance Dr0 is a designed distance between the first detection object 51 and the second detection object 52. The theoretical reference distance Dr0 may be obtained in any way. The theoretical reference distance Dr0 may be stored in advance, for example, in the memory of the print controller 20 or in the memory 12 of the main controller 10. In this embodiment, the theoretical reference distance Dr0 is equal to the designed width of the sheet Q.

The print controller 20 calculates the correction value Y based on the obtained first and second count values C1 and C2 and the theoretical reference distance Dr0. Specifically, the print controller 20 calculates the correction value Y as the value obtained by dividing the theoretical reference distance Dr0 by an actual count difference. The actual count difference corresponds to a difference between the first count value C1 and the second count value C2 (see FIG. 3).

The print controller 20 further obtains a print start position Pst. The print start position Pst is, for example, stored in advance in the print controller 20 or the main controller 10. The print start position Pst may be, for example, the first end of the sheet Q, a position offset a predetermined distance upstream or downstream in the main scanning direction from the first end, or a position offset a predetermined distance upstream from a center position of the sheet Q in the main scanning direction. FIG. 3 depicts an example where the print start position Pst is set at the first end of the sheet Q.

The print controller 20 calculates a print start count value Cst, which is the count value corresponding to the obtained print start position Pst. The print start count value Cst is calculated based on the third and fourth count values C3 and C4 stored by the pre-scan. For example, if the print start position Pst is set at the first end of the sheet Q, the print controller 20 calculates the third count value C3 as the print start count value Cst. For example, if the print start position Pst is set at the position offset from the first end of the sheet Q by the predetermined distance in the main scanning direction, the number of counts corresponding to the predetermined distance ("offset counts") is calculated based on the third and fourth count values C3, C4 and a theoretical value of the width (length in the main scanning direction) of the sheet Q. Then, based on the calculated offset counts, the print start count value Cst is calculated. For example, the value obtained by adding the offset counts to the third count value C3 is calculated as the print start count value Cst. In this embodiment, as described above, the print start position Pst is set at the first end of the sheet Q. Therefore, the third count value C3 corresponding to the print start position Pst is set as the print start count value Cst (see FIG. 3).

After the correction value Y and the print start count value Cst are calculated in this manner, the print controller 20 moves the carriage 30 and jets the ink from the recording head 21 for image formation based on the ink jetting instruction from the main controller 10. Specifically, the carriage 30 is moved from the home position 61 along the main scanning direction in accordance with a speed profile. When the count value reaches the print start count value Cst (i.e., when the carriage 30 reaches the print start position Pst), an ink jetting is started in accordance with the ink jetting instruction.

Specifically, the print controller 20 calculates a virtual carriage position Pdash according to the following formula (1). The virtual carriage position Pdash is the position Px of the carriage 30 recognized by the print controller 20.

$$Pdash = Pst + Cn * Y \quad \text{[Formula (1)]}$$

In the above formula (1), the variable Cn indicates a count value relative to the print start count value Cst (see FIG. 3). In other words, the amount of change in the count value from the print start count value Cst corresponds to the variable Cn. Therefore, "Cn*Y" (i.e., the product of the variable Cn and the correction value Y) in the second term on the right side of the above formula (1) indicates the moving distance in the main scanning direction from the print start position Pst. In other words, the virtual carriage position Pdash is obtained by adding the moving distance calculated by using the correction value Y to the print start position Pst. The "correction property" illustrated in FIG. 3 with a single dotted line depicts an example of a relationship between the count value and the virtual carriage position Pdash.

After the carriage 30 reaches the print start position Pst, the print controller 20 calculates the virtual carriage position Pdash according to the above formula (1). Then, based on the calculated virtual carriage position Pdash, the ink is jetted onto the sheet Q to form the image on the sheet Q. For example, suppose that the ink jetting instruction from the main controller 10 instructs to jet the ink between positions Pa and Pb and not to jet the ink between positions Pb and Pc. In this case, the print controller 20 causes the ink to be jetted from a timing when the virtual carriage position Pdash matches Pa to a timing when the virtual carriage position Pdash matches Pb. Then, the print controller 20 causes the ink not to be jetted from a timing when the virtual carriage position Pdash matches Pb to a timing when the virtual carriage position Pdash matches Pc.

Thus, by controlling the ink jetting from the print start position Pst based on the virtual carriage position Pdash, the image formation at a desired position in the sheet Q can be performed with high accuracy.

(3) Print Controlling Process

Figure 4:
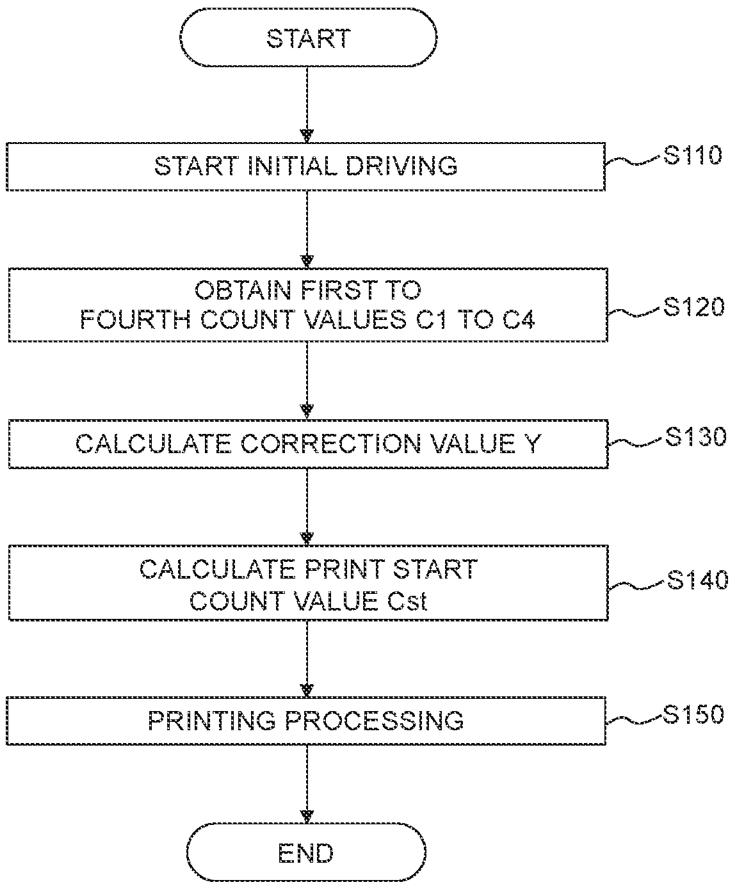
FIG. 4 is a flow chart of a print control process.

A print controlling process executed by the print controller 20 is explained with reference to FIG. 4. When the main controller 10 receives the print instruction (including image data) from outside and various instructions based on the print instruction are inputted from the main controller 10 to the print controller 20, the print controller 20 executes the print controlling process depicted in FIG. 4 based on the instructions. When the print controlling process is executed, the CR motor 31 and the recording head 21 are driven to form the image based on the image data on the sheet Q. The print controlling process may be executed based on a software or by a hardware process.

When the print controller 20 starts the print controlling process, the print controller 20 starts an initial drive for the pre-scan at S110. The initial drive includes causing the carriage 30 to reciprocate once from the home position 61. After the initial drive is started, the print controller 20 obtains the first to fourth count values C1 to C4 at S120. Specifically, as described above, the first to fourth count values C1 to C4 are obtained based on the detection signals inputted from the medium sensor 25 during the movement and the count values from the first signal processing circuit 34.

After the initial drive is completed, the print controller 20 calculates the correction value Y at S130. Specifically, the correction value Y is calculated in the aforementioned manner based on the first and second count values C1 and C2 obtained in S120 and the theoretical reference distance Dr0.

Further, at S140, the print controller 20 obtains the print start position Pst and calculates the print start count value Cst based on the print start position Pst and the third and fourth count values C3 and C4 obtained at S120 in the manner described above. By the process up to this point, a preparation for calculating the virtual carriage position Pdash is completed.

The print controller 20 executes a printing process at S150. Specifically, as described above, the ink is jetted from the recording head 21 onto the sheet Q while the carriage 30 is reciprocated along the main-scanning direction, each time the sheet Q is conveyed in the sub-scanning direction by a certain amount. This forms the image on the sheet Q. In the ink jetting from the recording head 21 in the printing process, when the carriage 30 reaches the print start position Pst (i.e., the count value reaches the print start count value Cst), the print controller 20, thereafter, calculates the virtual carriage position Pdash by using the above formula (1) at least within a range where the ink is to be jetted onto the sheet Q. Then, the ink is jetted based on the virtual carriage position Pdash.

(4) Effects of Embodiment and Correspondence of Wordings

In the image forming system 1 of the above described embodiment, the first and second detection objects 51, 52 are detected by using the single medium sensor 25 for the calculation of the correction value Y and the virtual carriage position Pdash based on the correction value Y (hereinafter collectively referred to as "correction calculation"). Furthermore, the medium sensor 25 is not additionally installed for the correction calculation, but is installed for a purpose different from the correction calculation (e.g., detection of the presence or absence of the sheet, detection of both ends of sheet, etc.). In this embodiment, the medium sensor 25, which is originally provided for the purpose different from the correction calculation, is also used for the correction calculation.

Therefore, the moving distance of the carriage 30 and thus the position of the carriage 30 (in detail, the virtual carriage position Pdash) can be calculated with high accuracy while reducing the manufacturing cost of the imaging system 1.

Moreover, in this embodiment, the detection of the first and second detection objects 51, 52 by the medium sensor 25 is performed while the carriage 30 is moving. Therefore, the occurrence of the aforementioned problem (problem of reduced correction accuracy due to deflection of the belt 27*c*, etc.) can be suppressed, and the calculation accuracy of the virtual carriage position Pdash can be improved.

In this embodiment, the calculation of the virtual carriage position Pdash by using the correction value Y is performed from the print start position Pst. In other words, the virtual carriage position Pdash is not calculated from the start of the movement of the carriage 30 to the print start position Pst, but the virtual carriage position Pdash is calculated in a section where the virtual carriage position Pdash is required. Therefore, the virtual carriage position Pdash can be calculated efficiently as needed.

In this embodiment, the first and second ends of the sheet Q are set as the first and second detection objects 51, 52. Therefore, the first and second count values C1 and C2 necessary for calculating the correction value Y and the third and fourth count values C3 and C4 necessary for calculating the print start count value Cst can be obtained from the detection results of substantially two locations. Therefore, the processing load for the correction calculation can be reduced.

In this embodiment, the first and second detection objects 51, 52 are provided in the single member. Specifically, in this embodiment, the first and second detection objects 51, 52 are provided in the sheet Q. Therefore, the actual distance between the first and second detection objects 51, 52 is restrained from deviating from the theoretical reference distance Dr0.

In this embodiment, the sheet Q corresponds to an example of the target and the sheet in this disclosure. The recording head 21 corresponds to an example of the discharging head in this disclosure. A combination of the carriage 30 and the recording head 21 corresponds to an example of the movable body in the present disclosure. The first encoder 33 and the first signal processing circuit 34 correspond to an example of the rotation amount information outputting section in the present disclosure. The medium sensor 25 corresponds to an example of the detecting unit in the present disclosure. The print controller 20 corresponds to an example of the controller in the present disclosure. Jetting the ink onto the sheet Q corresponds to an example of the predetermined operation in the present disclosure, and forming the image on the sheet Q by jetting the ink corresponds to an example of processing the target in the present disclosure. The main scanning direction corresponds to an example of the movement direction in the present disclosure. The first count value C1 corresponds to an example of the first rotation amount information in this disclosure, and the second count value C2 corresponds to an example of the second rotation amount information in this disclosure. The theoretical reference distance corresponds to an example of the theoretical distance information in this disclosure. The print start position Pst corresponds to an example of the defined position in the present disclosure.

The process in S110 corresponds to an example of the moving process in the present disclosure. The process in S120 corresponds to an example of the rotation amount information obtaining process in the present disclosure. The process in S130 corresponds to an example of the correction value calculating process in the present disclosure. The process in S150 corresponds to an example of the moving distance calculating process and the controlling process in the present disclosure.

2. Other Embodiments

The embodiment of the present disclosure is described above. The present disclosure is not limited to the embodiment described above, but can be implemented with various modifications.

(1) In the above embodiment, the first and second ends of the sheet Q were set as the first and second detection objects 51, 52. However, the first and second detection objects 51, 52 may be set anywhere, respectively.

Figure 5:
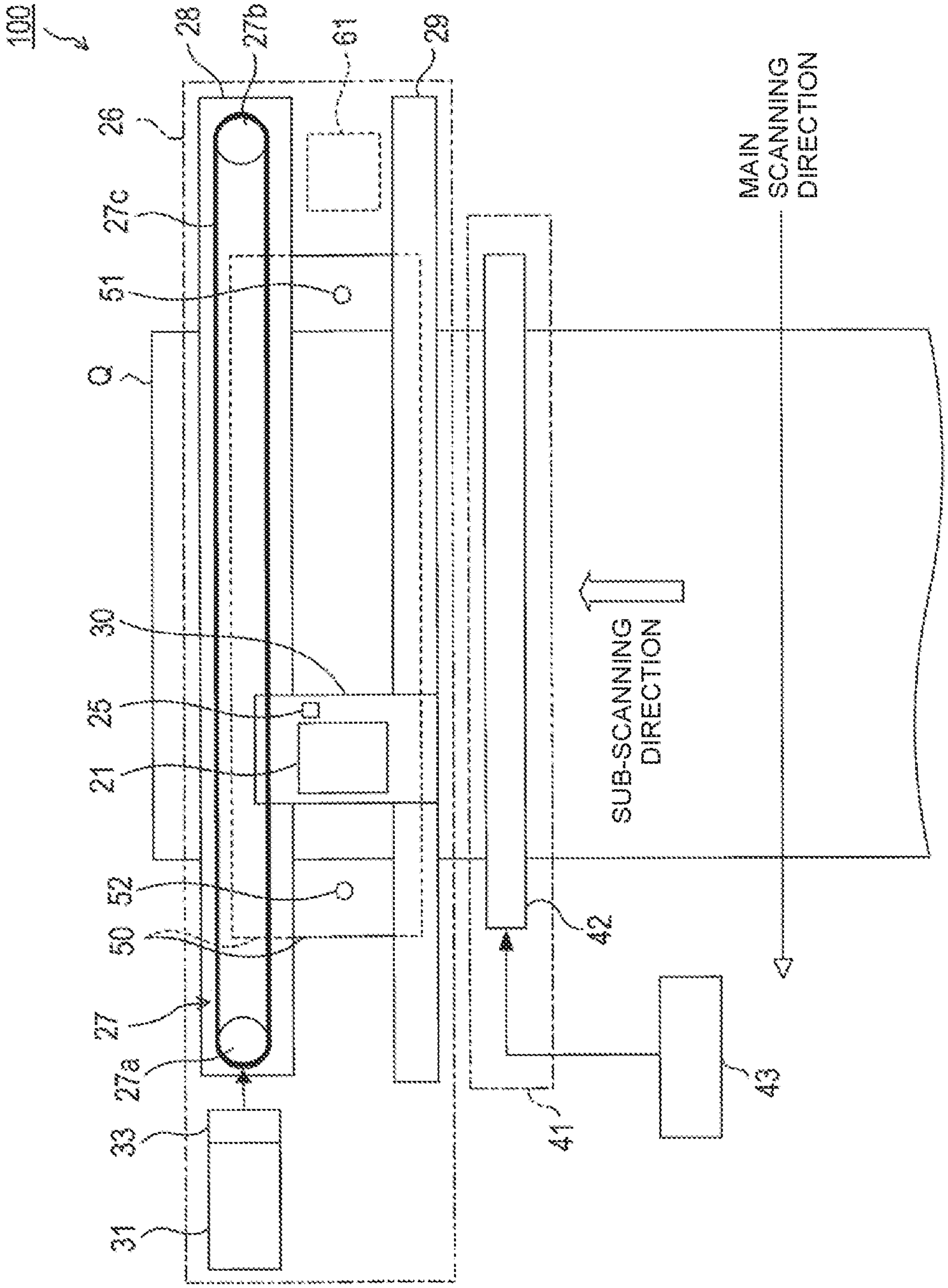
FIG. 5 is a view for explaining another implementation example of first and second detection objects.

For example, as in the image forming system 100 illustrated in FIG. 5, the first and second detection objects 51, 52 may be provided on the platen 50. In the example depicted in FIG. 5, the first detection object 51 is provided on the platen 50 in a home direction side with respect to an area where the sheet Q is conveyed, and the second detection object 52 is provided on the platen 50 in a main scanning direction side with respect to the area where the sheet Q is conveyed. The first and second detection objects 51, 52 may be provided in any manner relative to the platen 50. For example, the first and second detection objects 51, 52 may be formed integrally with the platen 50 by a predetermined integral molding method (e.g., injection molding). For example, the first and second detection objects 51, 52 may be prepared separately from the platen 50 and attached to the platen 50.

If the first and second detection objects 51, 52 are provided at different parts from the sheet Q, the first to fourth count values C1 to C4 take different values from each other. In this case, however, the correction value Y can be calculated in basically the same way as in the above embodiment, and the virtual carriage position Pdash can also be calculated.

One or both of the first and second detection objects 51, 52 may be located at a different site from both the sheet Q and the platen 50.

(2) In the above embodiment, the correction calculation was performed by the print controller 20, but the correction calculation may be performed anywhere. For example, some or all of the correction calculation may be performed by other section than the print controller 20 (e.g., main controller 10).

(3) The first encoder 33 may be a linear encoder, for example. The rotation amount information outputting section of the present disclosure may not have the encoder and may be configured to output the rotation amount information based on a detection result by a rotation detection means different from the encoder.

(4) The carriage 30 may be provided with additional sensors in addition to the medium sensor 25. In this case, however, in the correction calculation, the first to fourth count values C1 to C4 is obtained based on the detection result of only the single medium sensor 25.

(5) Although, in the above embodiment, the carriage 30 and the recording head 21 correspond to the example of the movable body of the present disclosure, the movable body of the present disclosure is not limited to the carriage 30 and the recording head 21. The present disclosure can be applied to any movable body configured to process the target by performing a predetermined operation in a process of the movement.

In the above embodiment, jetting the ink from the recording head 21 onto the sheet Q is exemplified as the predetermined operation by the movable body, and forming the image on the sheet Q is exemplified as processing the target, but both the predetermined operation and the processing of the target are not limited to these. In other words, the technology of the present disclosure is not limited to application to the image forming system 1. For example, the technology of the present disclosure can be applied to printers other than inkjet printers (e.g., other serial printers) and garment printers. The technology of the present disclosure is further applicable to various devices other than the printers. For example, the technology of the present disclosure can be applied to machine tools such as machines for printing wiring patterns. The technology of the present disclosure can be applied to various controlling systems which convey movable bodies by means of motor control.

(6) It is allowable that a function possessed by one constituent component in the above-described embodiment is provided in a dividing manner in a plurality of constituent components. It is allowable that a function possessed by a plurality of constituent components is integrated in one constituent component. Further, it is also allowable that a part of the configuration of the above-described embodiment may be omitted. Furthermore, it is also allowable that at least a part of the configuration of the above-described embodiment is added to or replaced with respect to that of the configuration of the another embodiment as described above. The embodiments of the present disclosure include various embodiments or aspects that are included in the technical ideas specified by the wordings of the following claims.

What is claimed is:

1. A controlling system, comprising:

a motor;

a movable body configured to be moved by the motor along a predetermined movement direction and configured to execute a predetermined operation for processing a target during a movement along the predetermined movement direction;

a single detecting unit mounted on the movable body, the single detecting unit being configured to detect presence or absence of a sheet, and a first detection target and a second detection target during the movement of the movable body, the first detection target and the second detection target are offset from each other along the predetermined movement direction, the first detection target and the second detection target being detectable by the single detecting unit moving along the predetermined movement direction;

a rotation amount information outputting section configured to output rotation amount information indicating a rotation amount of the motor, where the rotation amount information outputting section includes a rotary encoder configured to output a pulse each time the motor rotates a predetermined angle, the rotation amount information outputting section is configured to count a number of pulses outputted from the rotary encoder and output a count value of the number of pulses as the rotation amount information; and a controller configured to execute:

a moving process for moving the movable body by the motor along the predetermined movement direction;

a rotation amount information obtaining process for obtaining first rotation amount information and second rotation amount information, the first rotation amount information being the rotation amount information outputted from the rotation amount information outputting section only in response to the single detecting unit detecting the first detection target during the movement of the movable body in the moving process, the second rotation amount information being the rotation amount information outputted from the rotation amount information outputting section only in response to the single detecting unit detecting the second detection target during the movement of the movable body in the moving process;

a correction value calculating process for calculating a correction value indicating an actual moving distance of the movable body per predetermined rotation amount of the motor, based on the first rotation amount information and the second rotation amount information obtained in the rotation amount information obtaining process and theoretical distance information indicating a design distance between the first detection target and the second detection target; and a moving distance calculating process for calculating a moving distance of the movable body by using the rotation amount information outputted from the rotation amount information outputting section and the correction value calculated in the correction value calculating process, wherein in a case that the movable body is moved in the predetermined movement direction from a defined position, in the moving distance calculating process, the controller is configured to calculate the moving distance of the movable body from the defined position by multiplying a change amount of the count value from the defined position by the correction value calculated in the correction value calculating process, wherein, in the moving distance calculating process, the controller is further configured to calculate a position of the movable body based on the defined position and the calculated moving distance of the movable body from the defined position, and the controller is configured to further execute a controlling process for controlling the predetermined operation of the movable body based on the position of the movable body calculated in the moving distance calculating process.

2. The controlling system according to claim 1, wherein in the correction value calculating process, the controller is configured to calculate the correction value indicating the actual moving distance of the movable body per one count of the pulse.

3. The controlling system according to claim 2, wherein in the correction value calculating process, the controller is configured to calculate the correction value by dividing the design distance between the first detection target and the second detection target by an actual count difference, and the actual count difference is a difference between a count value indicated by the first rotation amount information and a count value indicated by the second rotation amount information.

4. The controlling system according to claim 1, wherein the first detection target and the second detection target are provided on a single member.

5. The controlling system according to claim 1, wherein the movable body includes a discharging head configured to discharge ink, and the predetermined operation includes discharging the ink onto the sheet as the target from the discharging head to form an image on the sheet.

6. The controlling system according to claim 5, further comprising a platen which is a single member extended along the predetermined movement direction to face the discharging head moving together with the movable body, wherein the first detection target and the second detection target are provided on the platen.

7. The controlling system according to claim 5, wherein the first detection target is an end of the sheet in the predetermined movement direction of the movable body, and the second detection target is an opposite end of the sheet in the predetermined movement direction of the movable body.

8. The controlling system according to claim 7, wherein the controller is configured to further execute a sheet detecting process for detecting presence or absence of the sheet based on a detection from the single detecting unit.

9. The controlling system according to claim 1, wherein the rotation amount information outputting section is configured to output the rotation amount information based on each pulse outputted from the rotary encoder.

10. The controlling system according to claim 7, wherein the controller is further configured to detect a width of the sheet in the predetermined movement direction based on the detection of the end of the sheet in the predetermined movement direction and the opposite end of the sheet in the predetermined movement direction by the single detection unit.

* * * * *